US008698874B2

(12) United States Patent
Watson et al.

(10) Patent No.: US 8,698,874 B2
(45) Date of Patent: Apr. 15, 2014

(54) TECHNIQUES FOR MULTIPLE VIDEO SOURCE STITCHING IN A CONFERENCE ROOM

(75) Inventors: Josh Watson, Seattle, WA (US); Simone Leorin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 359 days.

(21) Appl. No.: 13/158,043

(22) Filed: Jun. 10, 2011

(65) Prior Publication Data

US 2012/0314015 A1    Dec. 13, 2012

(51) Int. Cl.
*H04N 7/14*    (2006.01)

(52) U.S. Cl.
USPC ........... 348/14.1; 345/619; 345/629; 709/201

(58) Field of Classification Search
USPC .................... 348/14.01–14.16; 370/259–271, 370/351–357; 709/201–207, 217–248; 345/418–428, 473–475, 581–689; 455/412.1–426.2, 456.1–466, 455/550.1–560, 575.1–575.9, 90.1–90.3
See application file for complete search history.

(56) References Cited

U.S. PATENT DOCUMENTS

| | | | | |
|---|---|---|---|---|
| 6,373,487 | B1 * | 4/2002 | Culbertson et al. ............ | 345/424 |
| 6,677,979 | B1 * | 1/2004 | Westfield .................... | 348/14.12 |
| 6,839,067 | B2 * | 1/2005 | Liu et al. ....................... | 345/647 |
| 6,853,398 | B2 * | 2/2005 | Malzbender et al. ...... | 348/14.09 |
| 6,914,600 | B2 * | 7/2005 | Malzbender et al. ......... | 345/424 |
| 7,181,064 | B1 * | 2/2007 | Stevens et al. ................ | 382/165 |
| 7,298,392 | B2 * | 11/2007 | Cutler ............................ | 348/36 |
| 7,327,899 | B2 * | 2/2008 | Liu et al. ....................... | 382/276 |
| 7,854,518 | B2 * | 12/2010 | Culbertson et al. ............ | 353/69 |
| 8,270,767 | B2 * | 9/2012 | Park ............................... | 382/284 |
| 2005/0185047 | A1 * | 8/2005 | Hii .................................. | 348/36 |
| 2007/0269111 | A1 * | 11/2007 | Bolin et al. .................... | 382/195 |
| 2007/0279484 | A1 * | 12/2007 | Derocher et al. .......... | 348/14.09 |
| 2008/0240612 | A1 * | 10/2008 | Liang et al. ................... | 382/284 |
| 2009/0002480 | A1 | 1/2009 | Cutler | |
| 2010/0128105 | A1 * | 5/2010 | Halavy ....................... | 348/14.05 |
| 2010/0165069 | A1 * | 7/2010 | Kadono ..................... | 348/14.01 |
| 2010/0245535 | A1 * | 9/2010 | Mauchly .................... | 348/14.08 |
| 2011/0025819 | A1 * | 2/2011 | Gorzynski et al. .......... | 348/14.07 |
| 2011/0096136 | A1 * | 4/2011 | Liu et al. .................... | 348/14.07 |
| 2011/0211036 | A1 * | 9/2011 | Tran ........................... | 348/14.08 |

OTHER PUBLICATIONS

Saban, et al., "Fast Stitching of Videos Captured from Freely Moving Devices by Exploiting Temporal Redundancy", Retrieved at <<http://research.microsoft.com/pubs/131912/ICIP2010_time_info_V3.pdf>> Sep. 27, 2010, pp. 8.
Steedly, et al., "Efficiently Registering Video into Panoramic Mosaics", Retrieved at <<http://research.microsoft.com/pubs/75621/Steedly-ICCV05.pdf>> Oct. 21, 2005, pp. 4.

* cited by examiner

*Primary Examiner* — Hemant Patel
(74) *Attorney, Agent, or Firm* — Sonia Cooper; Peter Taylor; Micky Minhas (57) ABSTRACT

Techniques to stitch together multiple video streams are described. In an embodiment, a technique may include receiving a plurality of video streams from a plurality of video sources in a room. The video streams may be analyzed for feature points, such as furniture, light fixtures, window frames and so forth. The video streams may be processed to make the video qualities of the video streams, such as scale, color, brightness and so forth, more consistent with each other. Using the feature points, the processed video streams may be stitched together to generate a unified stream. The unified stream may be output to a display in the room and/or to remote viewers. Other embodiments are described and claimed.

20 Claims, 8 Drawing Sheets

- RECEIVE VIDEO INFORMATION FROM A PLURALITY OF VIDEO CAMERAS IN A CONFERENCE ROOM
  602
- ANALYZE THE VIDEO STREAMS FOR FEATURE POINTS
  604
- STITCH THE VIDEO STREAMS TOGETHER USING THE FEATURE POINTS TO MAKE A UNIFIED STREAM
  606
- PROCESS THE VIDEO STREAMS TO MAKE THE VIDEO QUALITIES OF THE STREAMS MORE CONSISTENT WITH EACH OTHER
  608
- OUTPUT THE UNIFIED STREAM
  610

TECHNIQUES FOR MULTIPLE VIDEO SOURCE STITCHING IN A CONFERENCE ROOM

BACKGROUND

Many conference rooms have one or more cameras in them. The cameras may be fixed in the room, and/or part of portable devices. The video information from the cameras is typically used and viewed separately and may not show how the information from one camera is related spatially to another camera. Some specialized cameras may be able to show a 360 degree view from a fixed point, but may not be able to show additional viewing angles available from other devices, such as the front view of all participants. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques for multiple video sources stitching in a conference room. Some embodiments are particularly directed to techniques to use stitched video for mapping a conference room. In one embodiment, for example, a technique may comprise receiving a plurality of video streams from a plurality of video sources in a room. The video streams may be analyzed for feature points, such as furniture, light fixtures, window frames and so forth. The video streams may be processed to make the video qualities of the video streams, such as scale, color, brightness and so forth, more consistent with each other. Using the feature points, the processed video streams may be stitched together to generate a unified stream. The unified stream may be output to a display in the room and/or to remote viewers. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to stitching together multiple video streams from a plurality of video sources in a conference room, and in particular from video sources that may be mobile. The stitched video stream may be somewhat analogous to a panorama, although may not necessarily provide a complete 360 degree view.

Embodiments may receive video streams from the multiple cameras, including cameras from devices such as cell phones, laptop computers, and tablet computers. The video streams may be analyzed for feature points, e.g., furniture, plants, equipment, light fixtures, windows, doors, wall mounted objects, people, and so forth. When the same feature is identified in more than one video stream, those video streams may potentially be stitched together, using the feature point to align the video streams. Because video streams from different cameras may differ in various qualities, the video streams may be processed to make them more similar to each other, for example, in scale, resolution, brightness, color, and so forth. The processed unified video stream may be provided to remote participants to provide an improved view of the events and context of the teleconference.

In one embodiment, for example, the multiple video streams may be used to construct a model of the conference room. The model may include, for example, room geometry, positions of participants in the room, orientation of the participants, the location of devices such as video sources and light sources, and other features of the conference room.

Figure 1:
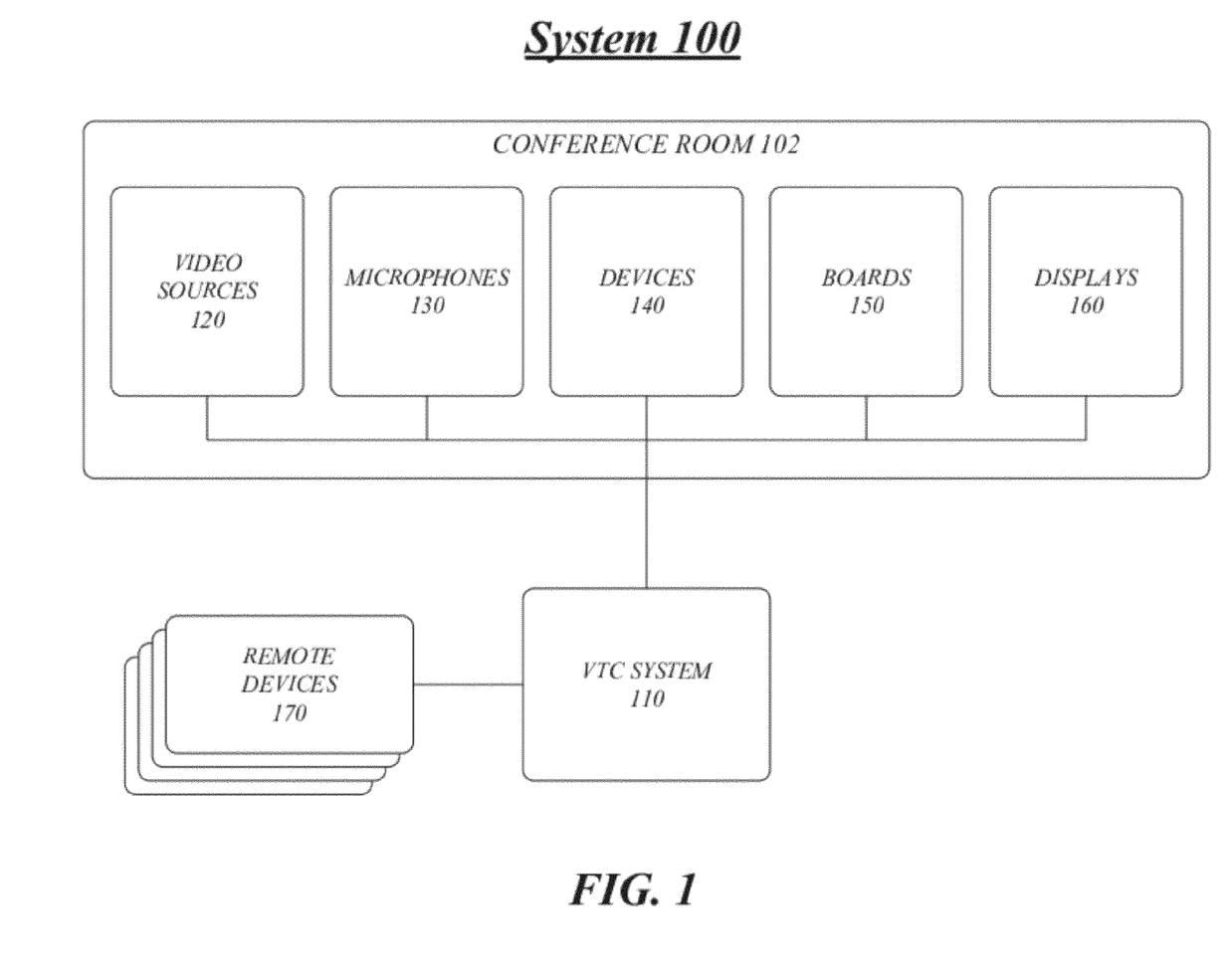
FIG. 1 illustrates an embodiment of a system for stitching together multiple video streams for a video teleconference.

FIG. 1 illustrates a block diagram for a system 100 to stitch together multiple video streams from a plurality of video sources in a conference room. In one embodiment, for example, the system 100 may comprise a computer-implemented system 100 having one or more components, such as VTC system 110, video sources 120, and a remote device 170. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented with one or more electronic devices. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a tablet computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

In various embodiments, the system 100 may include a video teleconferencing (VTC) system 110. VTC system 110 may be operative to coordinate a VTC by receiving audio, video, and data information from a conference and transmitting the information to one or more remote devices 170. VTC system 110 may also receive video, audio, and data information from remote participants via remote devices 170, and provide the information to other participants. VTC system 110 may include one or more electronic devices capable of operating a virtual teleconference. VTC system 110 may additionally manage information about who is participating, detect an active speaker, arrange a display of the different video feeds, and other functions of a VTC system. VTC system 110 may receive video streams from video sources 120 and perform a stitching operation to unify the different video streams. VTC system 110 may further use the video streams to generate a model of the conference room. VTC system 110 is described in greater detail with reference to FIG. 2.

System 100 may include various components physical located in a physical conference room 102. The conference room 102 may include, by way of example, one or more video sources 120, microphones 130, devices 140, boards 150, and displays 160. The conference room 102 may also include other types of conference room equipment, such as projectors, lighting systems, security systems, and so forth. The embodiments are not limited in this context.

Video sources 120 may include any camera capable of capturing video information from a defined field of view and providing the video information to VTC system 110. Examples of cameras may include, for example, a fixed camera, a pan-tilt-zoom (PTZ) camera, a camcorder, a tabletop camera, a 360 degree camera, a webcam, a laptop computer built-in camera, a cell phone camera, and so forth. In some embodiments, video sources 120 may be simple video cameras that record and/or transmit video to VTC system 110 of the participants in the room for a video teleconference, without any internal processing of the video images. For such video cameras, VTC system 110 may perform video processing tasks as needed.

In other embodiments, more sophisticated video cameras may perform pre-processing and/or post-processing of captured video images, thereby reducing computational load for VTC system 110. For instance, video sources 120 may be "smart" video cameras that perform video processing operations internally, including without limitation, face detection, motion detection, image stabilization, video compression, and so forth. Video sources 120 may also measure lighting information such as exposure, color warmth, contrast, brightness, and backlighting. Such video cameras may transmit unprocessed and/or processed video and lighting information to VTC system 110.

Microphones 130 may include any audio input device capable of capturing audio information from an area and providing the information to VTC system 110. Microphones 130 may include, for example, microphones built into a camera, table-top microphones, wearable microphones, cell phone microphones, microphone arrays, and so forth.

Devices 140 may include any electronic device capable of providing displayable content via VTC system 110 to displays 160 and remote devices 170. Devices 140 may include, for example, a computer, a smart phone, a DVD player, a satellite receiver, a cable television receiver, and so forth. Displayable content may include, for example, presentation slides, multimedia presentations, documents, images, television signals, and so forth.

Boards 150 may include any interactive surface in use during a conference. Boards 150 may include, for example, chalk boards, white boards, digital white boards, transparencies, paper pads, and so forth. Boards 150 may generally refer to collaborative surfaces where conference participants may generate content and conference data.

Displays 160 may include any device capable of showing video, audio, and/or computer data to the participants in the conference room. The material to be displayed may be received from VTC system 110. Displays 160 may include, for example, televisions, computer monitors, projection systems, cell phone screens, a liquid crystal display, a plasma display, and so forth. Displays 160 may show the various video feeds from other VTC devices in the conference. In an embodiment, displays 160 may also comprise speakers for the audio information.

Remote devices 170 may include electronic devices capable of interacting with VTC system 110. Remote devices 170 may be capable of displaying information received from VTC system 110, such as video and audio feeds from conference room 102, presentation materials, documents, and other components of a VTC. Remote devices 170 may have a VTC client application operative on the device to coordinate VTC functions with VTC system 110. In an embodiment, a remote participant may connect to a VTC using both a telephone and a remote device 170. Remote devices 170 may include, for example, a personal computer, a laptop computer, a table computer, a smart phone, and so forth.

VTC system 110 may receive as input data captured by video sources 120, microphones 130, devices 140, and/or boards 150. VTC system 110 may manage processing and distribution of the captured data such that remote participants can also see the captured data, including a stitched video stream, via remote devices 170. VTC system 110 may be in any location where it can receive data from video sources 120, microphones 130, devices 140 and boards 150, and where it can communicate with other VTC devices that are supporting a VTC from other locations. In an embodiment, none of the components of VTC system 110 may be located in conference room 102. In other embodiments, some or all components of VTC system 110 may be located in conference room 102.

Figure 2:
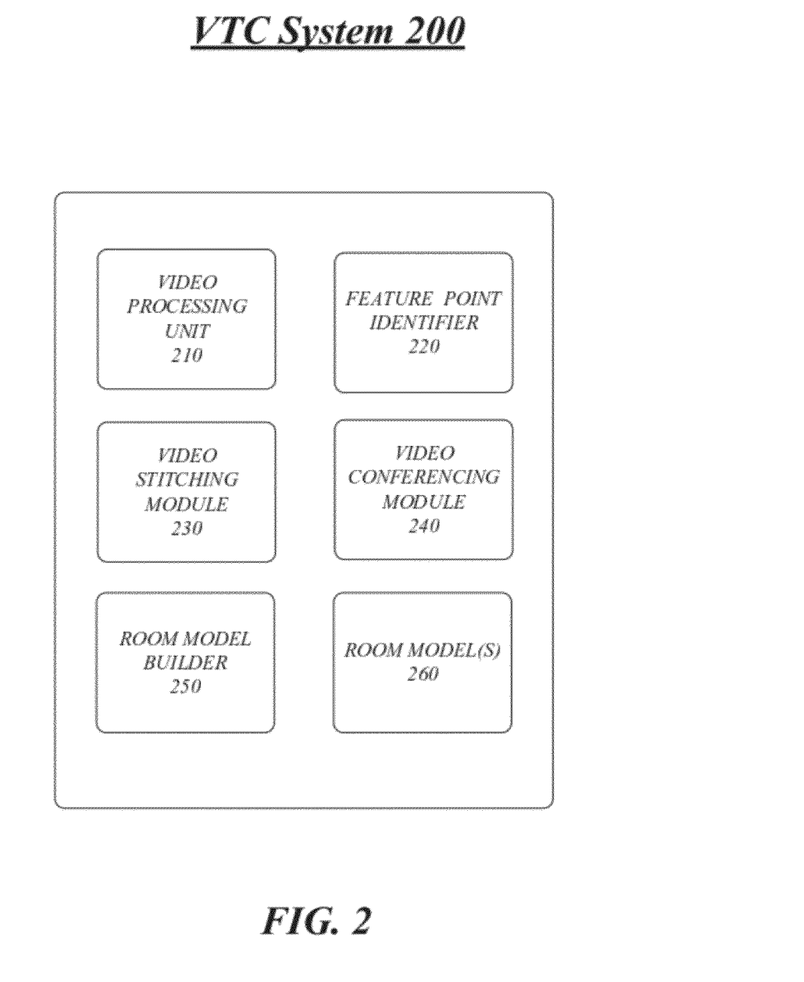
FIG. 2 illustrates a block diagram of a video teleconferencing system according to embodiments.

FIG. 2 illustrates a block diagram of a video teleconferencing (VTC) system 200. VTC system 200 may comprise an exemplary embodiment of VTC system 110 as described with reference to FIG. 1. VTC system 200 may include one or more components, such as a video processing unit 210, feature point identifier 220, video stitching module 230, a video conferencing module 240, a room model builder 250, and one or more room models 260.

In an embodiment, VTC system 200 may include a video processing unit 210. Video processing unit 210 may include logic that receives raw video data from a camera and performs various functions on the raw data. Such functions may include, for example, video data compression; image analysis to detect, for example, motion, people, and/or faces; color correction; image stabilization; contrast correction; scaling; and so forth. Such video processing functions are well known in the art. Video processing unit 210 may additionally process the detected faces to determine a directionality of the faces. For example, video processing unit 210 may determine that a side view of a face is detected, and may determine that the face is looking toward the left side of the video scene. Video processing unit 210 may detect the eyes on a face, and may analyze the detected eyes to determine an eye gaze direction. Video processing unit 210 may be a component of a video source 120, or may be separate from the video source 120, for example, as a component of a computing device.

In an embodiment, VTC system 200 may include a feature point identifier 220. Feature point identifier 220 may include logic that detects and identifies features in conference room 102 during a VTC. Feature point identifier 220 may analyze raw or processed video data from the plurality of video sources 120 to identify objects or people in the conference room that may be used to align and stitch the video streams. For example, feature point identifier 220 may use such characteristics as color, motion (or lack thereof), size and/or shape to identify objects in the room. The objects may include, for example, window and door frame edges, wall mounted items such as lamps and paintings, furniture, plants and so forth. If a participant is not moving, e.g. is seated, that participant may also be used as a feature point. Feature points may also include other room components, such as devices 140, boards 150, and displays 160. Feature point identifier 220 may be a camera component, or may reside on a separate device. Feature point identifier 220 may reside on the same device as, or separately from, video processing unit 210.

In an embodiment, VTC system 200 may include a video stitching module 230. Video stitching module 230 may include logic that selects video streams from video sources 120 and aligns them according to the identified feature points. For example, for a given identified feature point, video stitching module 230 may overlap video streams that include the feature point and align them at the feature point location. If the feature points in the different streams differ in some qualities, e.g. are different sizes, colors, brightness and so forth, video stitching module 230 may crop, resize, and/or blend the video streams to make the video streams more similar to each other. In an embodiment, video processing unit 210 may perform the blending process. Video stitching module 230 may perform this alignment and blending for all of the video streams that can be aligned to generate one unified video stream. The unified video stream may be somewhat analogous to a panorama view composed of images taken of adjacent views. The unified video stream, however, may not be as "smooth" as a panorama, because the video streams come from different locations and orientations within the room, as opposed to from one camera turning on a central point to create a panorama. With appropriately placed cameras, a 360 degree view of the room may be generated without the need for a specialty camera designed for that purpose.

If there are more than two video streams that can be aligned on a feature point, e.g. a hat rack, video stitching module 230 may discard one or more of the streams. For example, if a first video stream contains a second feature point, e.g. a window frame, that can be used to align with another video stream, while a second video stream only contains the hat rack, the second video stream may be discarded. The video sources 120 may be weighted based on, for example, quantity of information and quality of video stream. Video streams with higher resolution, greater color depth, and/or other desirable characteristics may be weighted higher than, and selected over, video streams with lower resolution, fewer colors, smaller fields of view, and so forth. If a video stream does not contain any feature points in common with the other video streams, video stitching module 230 may retain the video stream, but may display it separately from the unified stream. For example, the un-unified video stream may be displayed in a floating window near, next to, or overlapping the unified video stream.

In an embodiment, the unified video stream may be dynamically updated, for example, if a video source moves to show another part of the room. Feature point identifier 220 may identify feature points in the video stream that changed, and video stitching module 230 may update the unified video stream by aligning the changed video, if possible, to the other video streams.

In an embodiment, the displayed unified video stream may allow a viewer to drag, scroll, or other wise move the unified video stream in a window to see different parts of the unified video stream. This may be useful if a viewer is viewing the unified video stream on a small screen, such as a smart phone screen, a laptop screen or tablet screen. Viewers using a larger screen may be able to view the entire unified video stream at once.

In an embodiment, VTC system 200 may include a video conferencing module 240. Video conferencing module 240 may perform the coordinating tasks of operating a VTC, such as receiving and maintaining remote connections. In particular, video conferencing module 240 may receive the unified video stream from video stitching module 230, and send the unified video stream to the remote participants.

In an embodiment, VTC system 200 may include a room model builder 250. Room model builder 250 may include logic that uses the unified video stream to detect room configuration, including room geometry and relative locations of items such as windows and doors. Room model builder 250 may also detect items that may be functional to the conference, such as devices 140, boards 150, and displays 160. Room model builder 250 may also detect the locations of video sources 120. The detected geometry and items may be combined to form a room model 260. A room model 260 may be used, for example, by a room system control appliance to make available an enhanced video stream experience, room configuration guidance, and video imagery for database purposes. An enhanced video stream experience may be provided, for example, by combining a room model 260, motion detection and people detection to identify and interpret a person's interaction with the room. Room model 260 may be used to generate suggestions for video sources placement locations, and to calibrate the video sources in the room.

The components 210, 220, 230, 240 and 250 of VTC system 200 may be communicatively coupled via various types of communications media to each other and to video sources 120, microphones 130, devices 140, boards 150, and displays 160. The components may coordinate operations among each other. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

Figure 3:
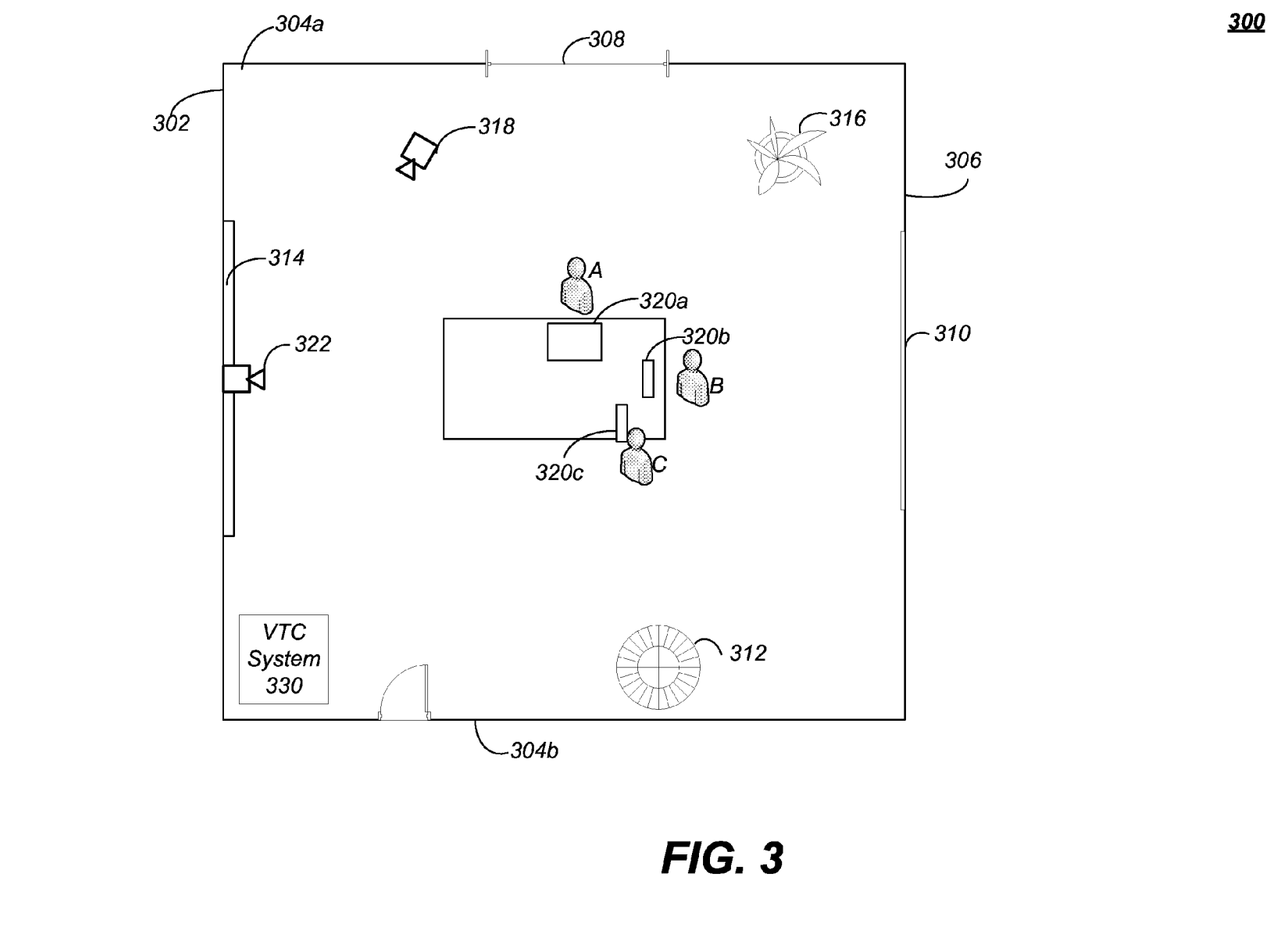
FIG. 3 illustrates an example of a conference room layout for a video teleconference according to embodiments

FIG. 3 illustrates a conference room 300 suitable for use in a video teleconference. Conference room 300 may comprise an exemplary embodiment of the conference room 102 as described with reference to FIG. 1. Conference room 300 may include a front wall 302, two side walls 304a, b, and a back wall 306. Conference room 300 may include feature points, such as: window 308, painting 310, lamp 312, board 314, and plant 316. Conference room 300 may include a ceiling or wall mounted camera 318. Camera 318 may also be a feature point. In a particular conference, conference room 300 may include participants A, B, and C. Participant A may have a laptop computer with a built-in camera 320a. Participant B may have a cell phone with a built-in camera 320b. Participant C may also have a cell phone with a built-in camera 320c. Conference room 300 may also include a PTZ camera 322. The field of view of camera 320a may include participant A and the portion of the room behind participant A, e.g. part of window 308. The field of view of camera 320b may include participant C, and the portion of the room behind participant C, e.g. part of painting 310. The field of view of camera 320c may include participant B, and e.g. painting 310. The field of view of camera 322 may include participants A, B and C as well as painting 310. The field of view of camera 318 may include board 314. One or more components of a VTC system 330 may be located in conference room 300, or may be located outside of the room but able to receive information from cameras 318, 320a-c, and 322.

In an embodiment, conference room 300 may include a table-top 360 degree camera (not shown) that can provide a view of a portion of the room up to a panoramic view of the whole room, such as, but not limited to, the ROUNDTABLE® camera from Microsoft Corp. of Redmond, Wash., or the POLYCOM® CX5000 from Polycom, Inc. of Pleasanton, Calif. Embodiments may supplement the view from a 360 degree camera with the different angles of view from cameras 320a-c. The embodiments are not limited to this example.

Figure 4:
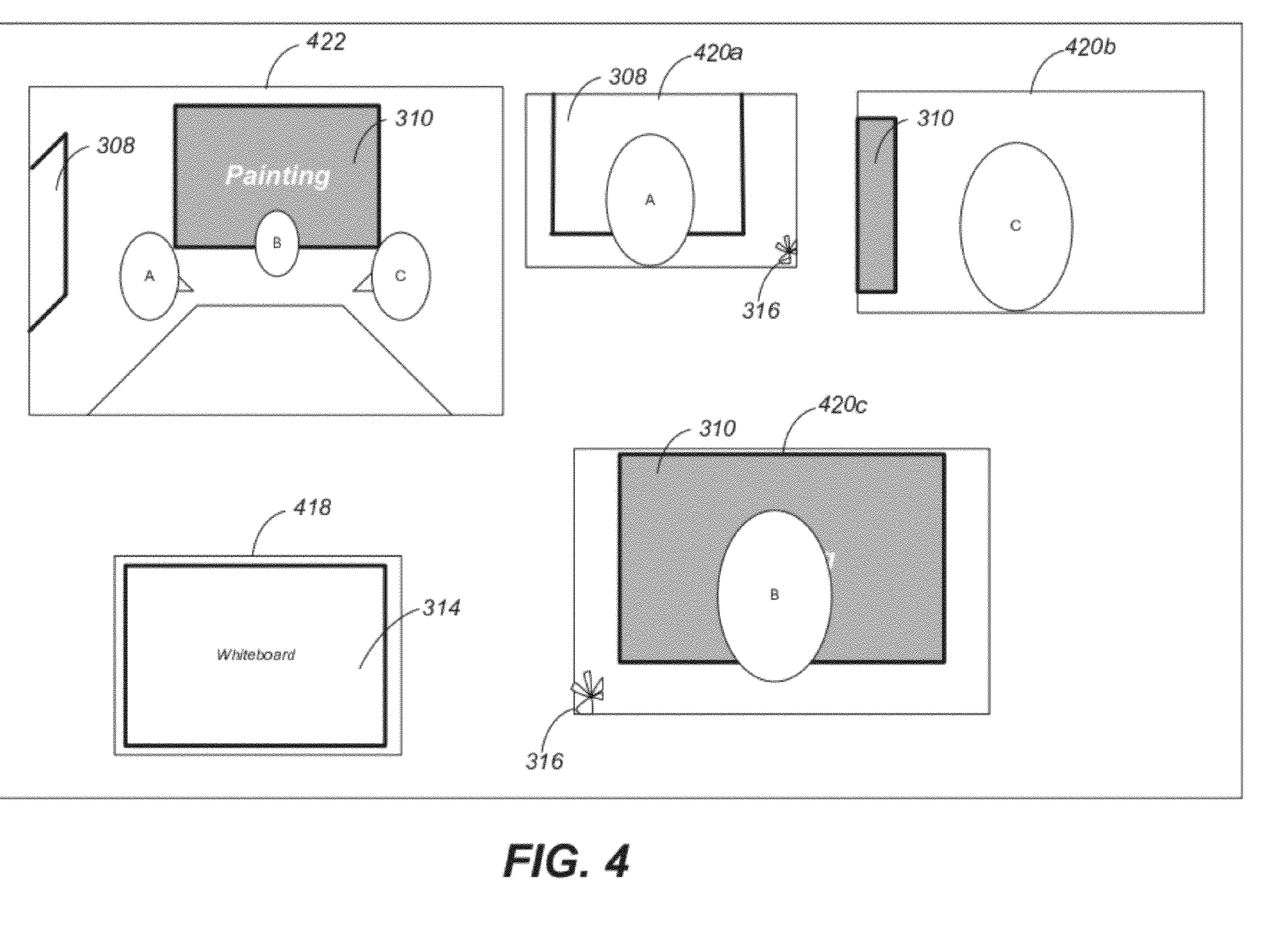
FIG. 4 illustrates an example of video streams from multiple video sources.

FIG. 4 illustrates an example of the video streams from cameras 318, 320a-c and 322 from FIG. 3, prior to stitching. Streams 418, 420a-c, and 422 correspond to cameras 318, 320a-c, and 322, respectively. Stream 422, from camera 322, shows the three participants A, B, and C, as well as painting 310 and a portion of window 308. Stream 420a, from the laptop camera 320a, shows participant A, window 308, and a part of plant 316. Stream 420b, from cell phone camera 320b, shows participant C and an edge of painting 310. Stream 420c, from cell phone camera 320c, shows participant B, painting 310 and plant 316. Stream 418 from camera 318 shows board 314. The different streams may differ in dimension, resolution, and other qualities.

Figure 5:
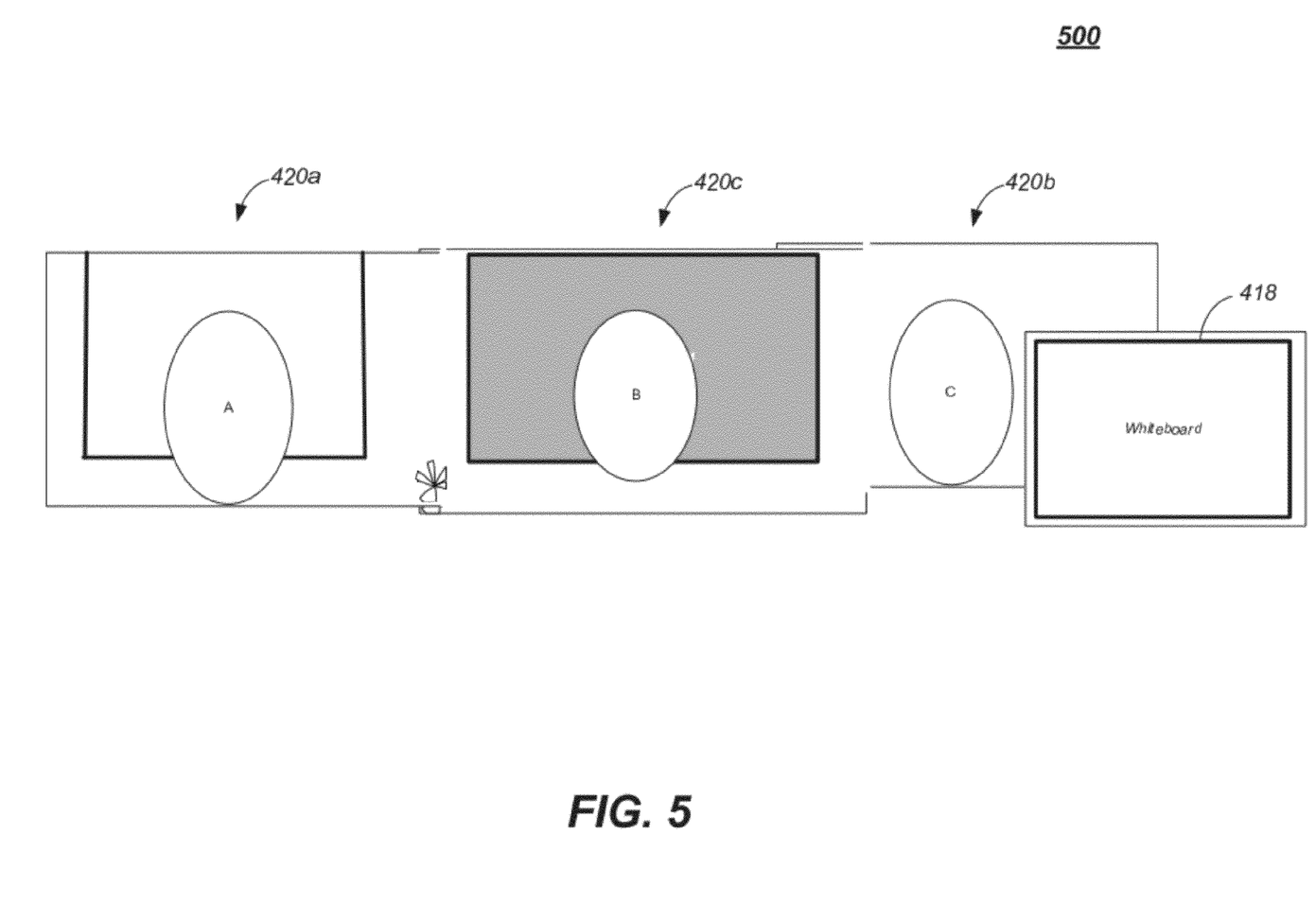
FIG. 5 illustrates an example of a stitched video stream according to embodiments.

FIG. 5 illustrates an example of a unified video stream 500 after a stitching operation on the video streams shown in FIG. 4 according to embodiments. The feature points available for stitching in this example include window 308, painting 310, and plant 316. While stream 422 shows all three participants, the view shown may not be considered optimal because two of the participants, A and C, are only seen in profile. Stream 422 may consequently have a lower weight than some of the other feeds.

Stream 418 has no feature points in common with any other stream. Stream 422 has window 308 in common with stream 420a and could be stitched to stream 420a. Stream 422 has painting 310 in common with both stream 420b and stream 420c and could be stitched to either or both. Stream 420a and stream 420b have no feature points in common and cannot be stitched together. Stream 420a and stream 420c have plant 316 in common as a feature point and could be stitched together. Stream 420b and stream 420c have painting 310 in common and could be stitched together.

Video stitching module 230 may then align stream 420a with stream 420c by positioning them such that plant 316 overlaps in the two streams. Stream 420c and stream 420b may be aligned by positioning them such that the right edge of painting 310 overlaps in the two streams. Stream 422 could be aligned such that the right edge of window 308 in stream 422 overlaps the right edge of window 308 in stream 420a. However, in this example, stream 422 is redundant and contains the less desirable and lower weighted profiles. Consequently, video stitching module 230 may discard stream 422 from the unified stream 500.

Because streams 420a-c have different dimensions, the streams may be scaled up or down, or cropped in order to make the streams more similar to each other. Stream 420a and 420b, for example, may be scaled up so that the faces of the participants in each stream are approximately the same size as the face of participant B in stream 420c. Stream 420c may be cropped to remove a lower portion of the image that does not align with the bottom edges of streams 420a and 420b. The edges of each stream may be blended to make the unified stream appear more as a continuous image. Other changes may also be made to make the individual streams more similar to each other, such as brightness adjustments, color balancing, and so forth. While FIG. 5 shows one way to generate a unified stream, other operations may be performed. For example, stream 420c could be scaled down to stream 420a or 420c. The embodiments are not limited to these examples.

Stream 418, having no feature points in common with the other streams, cannot be stitched directly to unified stream 500. However, the stream may still be relevant to the meeting participants. In one embodiment, stream 418 may be shown as a floating window over or behind unified stream 500. In an embodiment, a viewer may be able to move the floating window to a different location with respect to unified stream 500, or move it to the background or foreground.

In an embodiment, if one of the video sources changes its view, the unified stream may be updated. For example, if, in FIG. 3, laptop camera 320a is turned such that it is viewing board 314, the unified stream 500 would no longer be able to stitch streams 420a and 420c, and there would no longer be a view of participant A. In such a case, video stitching module 230 may use stream 422, aligned with stream 420c on the edge of painting 310 to update unified stream 500. Stream 420a may be discarded from the unified stream.

In an embodiment, unified stream 500 may be used to generate a room model. Room model builder 250 may use the unified stream, in combination with the unused streams, to record, for example, at least that wall 304a includes a window, that adjacent wall 306 includes a painting, and that the wall opposite wall 306 includes board 314. More detailed models may be built by using more cameras, or using the existing cameras in different orientations.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 6:
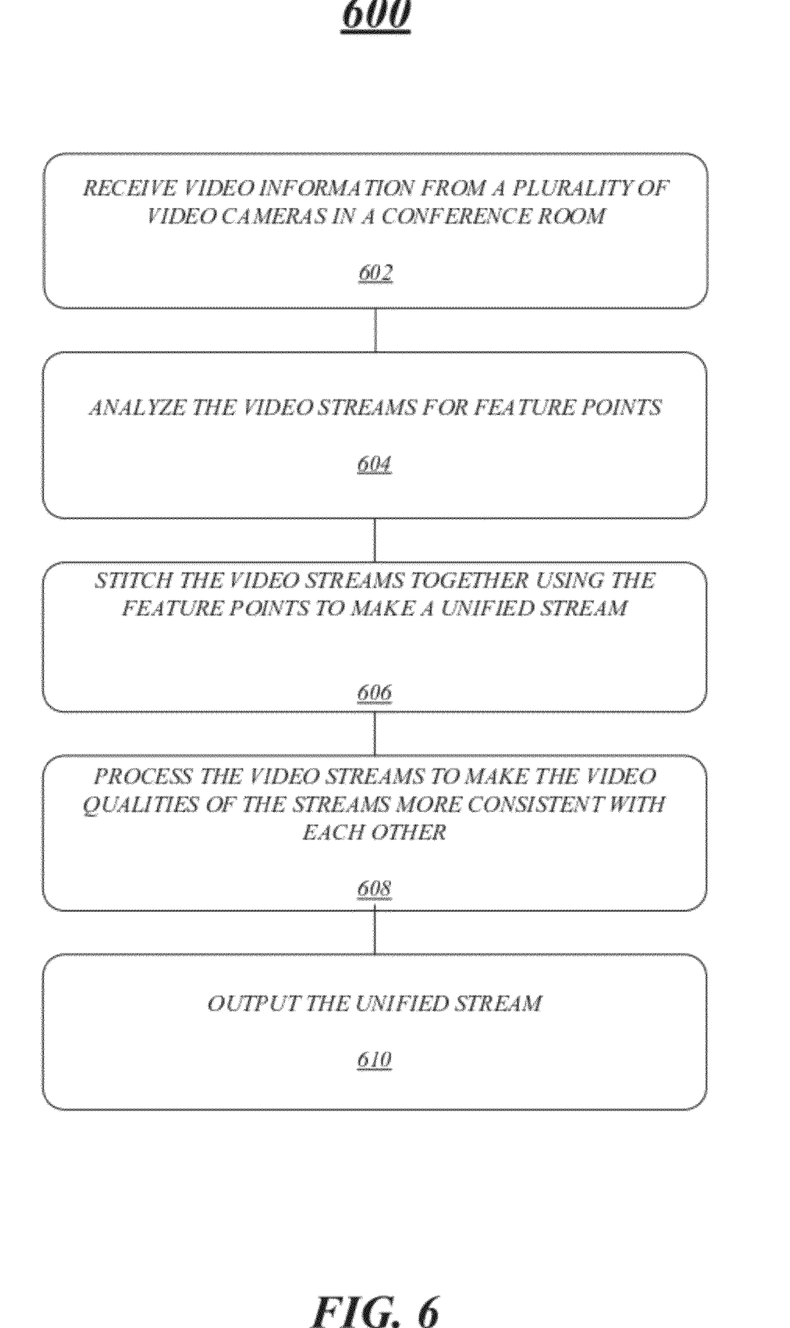
FIG. 6 illustrates an embodiment of a logic flow.

FIG. 6 illustrates one embodiment of a logic flow 600. The logic flow 600 may be representative of some or all of the operations executed by one or more embodiments described herein.

In the illustrated embodiment shown in FIG. 6, the logic flow 600 may receive information from multiple cameras in a conference room at block 602. For example, VTC system 110 may receive video streams from video sources 120. The video sources 120 may include fixed cameras and mobile cameras.

The logic flow 600 may analyze the video streams for feature points at block 604. For example, feature point identifier 220 may process the video streams, or receive processed video streams and may identify objects or room features in the videos streams. For example, portions of a video image having defined edges may be identified as a potential feature point. If the potential feature point appears fixed relative to the background, it may be considered a feature point. If a similar feature point appears in a separate video stream, then the feature point may be useful for stitching the two streams. In an embodiment, a feature point in common may be identified even when the size and/or color of the feature point in the different streams appear different due to camera differences. The embodiments are not limited to these examples.

In an embodiment, the process of identifying feature points in common may provide information about the differences between two streams. The information about the differences may be used during the unification process to blend the video streams. For example, if a feature point appears to be two different sizes in the streams, the difference in size may enable a scaling operation to bring one video stream to the same scale as the other video stream.

The logic flow 600 may stitch the video streams at the feature points to make a unified stream at block 606. For example, video stitching module 230 may locate a feature point in common in two video streams. The video streams may be aligned and joined such that the feature point overlaps in the two streams. In an embodiment, the videos streams from the video sources may be weighted according to factors such as, but not limited to, video quality, quantity of information in the stream, and the type of information in the stream, e.g. a profile view or a full-face view. If more than one video stream can be aligned with another on a feature point, the video stream with the higher weight may be selected.

The logic flow 600 may process the video streams in the unified stream to make the video qualities more consistent with each other at block 608. For example, video stitching module 230 or video processing unit 210 may scale the video streams to be substantially similar in scale to each other. Other processing operations may include color balancing, brightness and contrast adjustments, cropping, and so forth. In one embodiment, one video stream may be selected as the baseline, and the remaining streams may be adjusted to approach the qualities of the baseline. In another embodiment, an average among the video streams may be calculated for a given quality, and the video streams may be adjusted to approach the average. In some cases, the average values may be compared first to a range of acceptable values. If the average of a set of video streams falls outside of the range of acceptable values, then the video streams may be adjusted such that the quality in question is in the range of acceptable values. Additional operations may be performed to make the unified stream appear to be a single video stream, for example, blending away the edges of the video streams.

In an embodiment, block 606 may occur before block 608. In such an embodiment, only the video streams included in the unified stream may need to be processed. In another embodiment, block 608 may occur before block 606. Processing the video prior to stitching may simplify the stitching process. In an embodiment, block 608 may occur in part or in whole as part of the process of block 604. Processing the video prior to or during the identification of feature points may result in improved identification of feature points, particularly in cases where the camera characteristics are substantially dissimilar. The embodiments are not limited to these examples.

The logic flow 600 may output the unified stream at block 610. For example, the unified stream may be fed to remote devices 170 so that remote participants may view the participants in the conference room, and see their relative positions to each other. Such a view may provide a more realistic view of the conference room participants, and may help the remote participants to feel that they are a part of the conference. In an embodiment, a remote device 170 may display a portion of the unified stream, and allow the viewer to move or scroll through the unified stream to view the portion of interest to the viewer.

During the course of a video teleconference, logic flow 600 may be repeated continuously or at intervals. In particular, blocks 604-610 may be repeated when a video source changes its field of view. If a video stream has no feature points in common with other video streams, either initially or through a change in field of view, the video stream may be displayed as a separate component from the unified stream, e.g. as a floating window.

Figure 7:
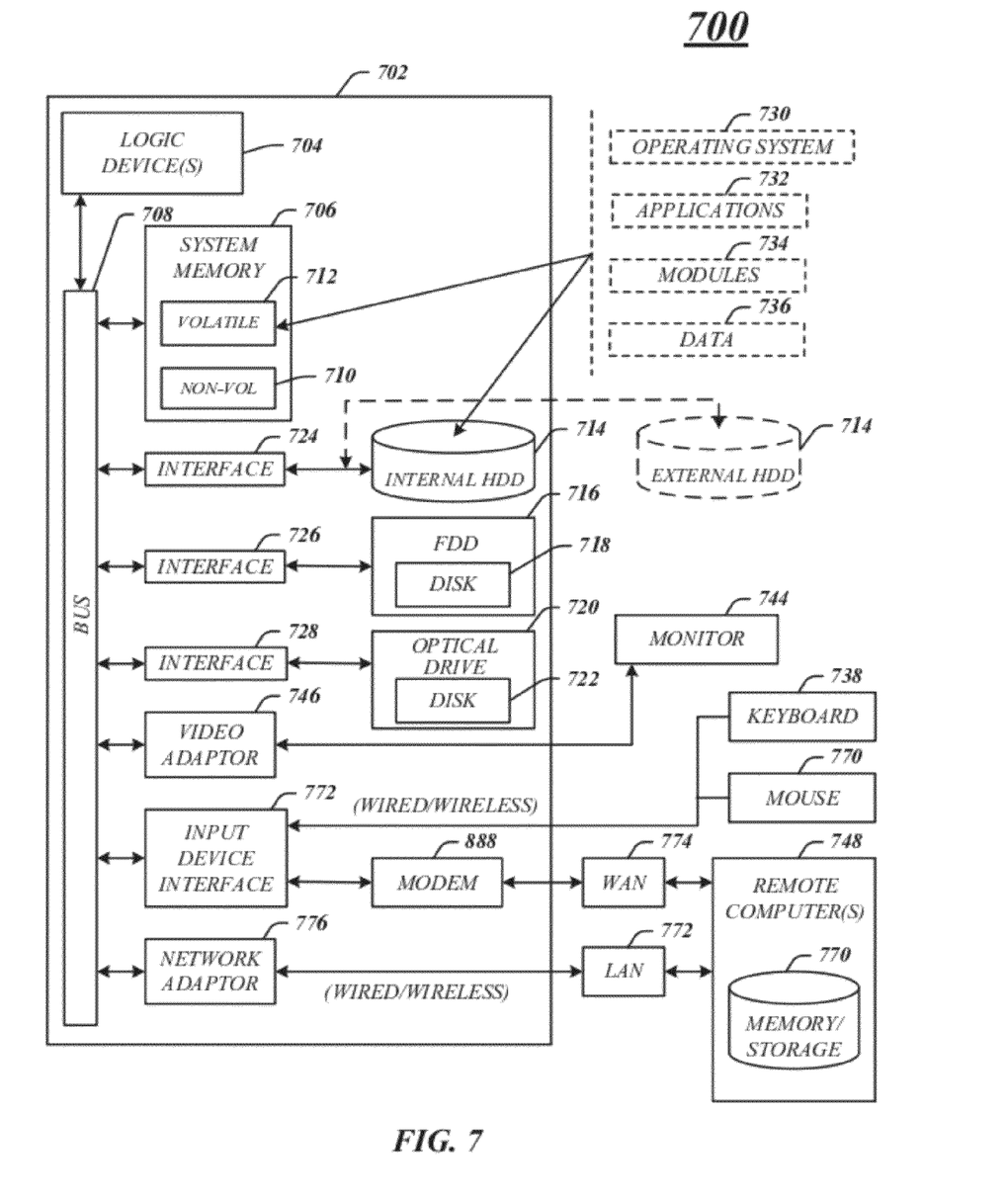
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the feature point identifier 220, video stitching module 230 and room model builder 250.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.7x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
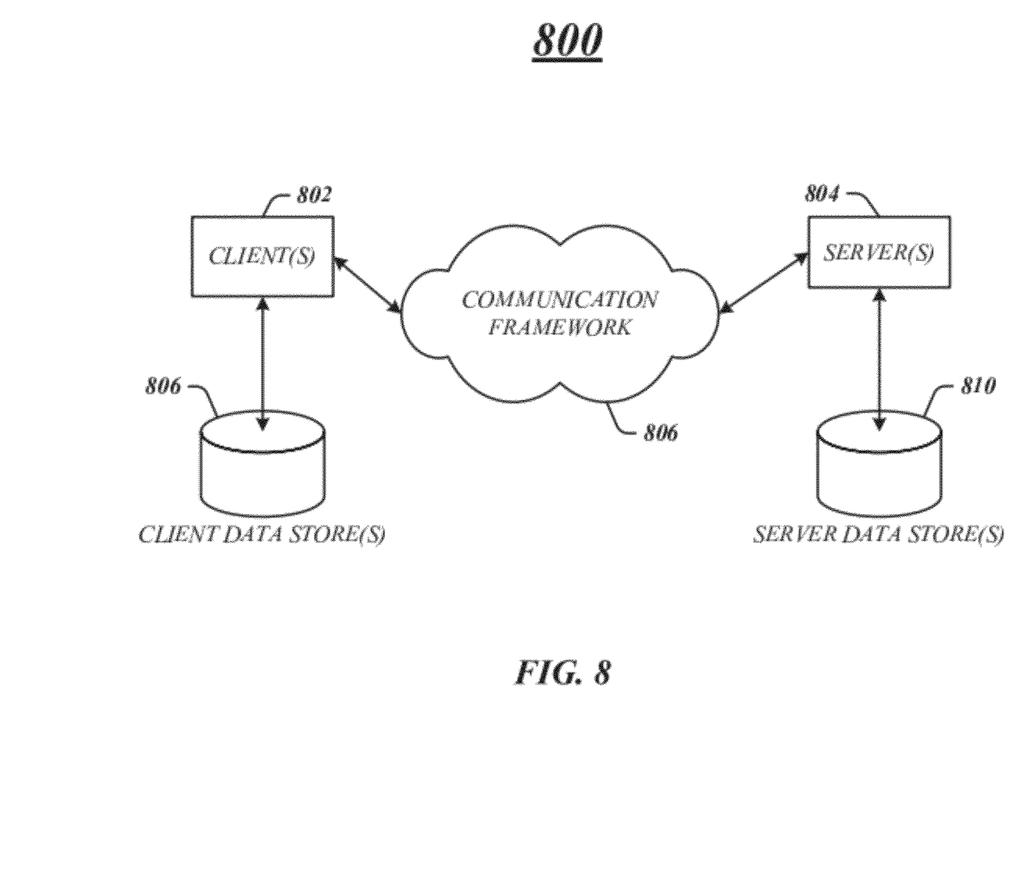
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement components of VTC system 110. The servers 804 may implement other components of VTC system 110. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A computer-implemented method, comprising:
 receiving a plurality of video streams from a plurality of video sources in a room;
 analyzing the video streams for feature points;
 stitching the video streams together using the feature points to generate a unified stream, wherein when more than two video streams include a same feature point, discarding at least one of the more than two video streams having a lower weight than other video streams of the more than two video streams from the stitching;
 processing the video streams to make one or more video qualities of the video streams more consistent with each other; and
 outputting the unified stream to a display.
2. The method of claim 1, further comprising dynamically updating the unified stream when the field of view of a video source changes.
3. The method of claim 1, further comprising analyzing the unified stream to generate a room model and to detect at least one of items and people in the room.
4. The method of claim 3, further comprising analyzing a room model to generate suggestions for camera placement locations in the room.
5. The method of claim 1, wherein processing the video streams to make the one or more video qualities of the video streams more consistent with each other comprises at least one of:

scaling the video streams to have a substantially similar scale;

adjusting a color balance of the video streams to have a substantially similar color balance;

adjusting a resolution of the video streams to have a substantially similar resolution;

adjusting a contrast of the video streams to have a substantially similar contrast;

adjusting a brightness of the video streams to have a substantially similar brightness; or cropping a window size of the video streams to have a substantially similar window size.

6. The method of claim 1, wherein stitching the processed video streams together using the feature points to generate a unified stream comprises:

identifying a same feature point in two video streams;

aligning the two video streams on the same feature point; and joining the two aligned video streams into a unified video stream.

7. The method of claim 6, further comprising displaying a video stream separately from the unified stream when the video stream has no features in common with the other video streams.

8. The method of claim 1, wherein the video sources include at least one of a fixed camera, a pan-tilt-zoom (PTZ) camera, a camcorder, a tabletop camera, a 360 degree camera, a webcam, a laptop computer built-in camera, or a cell phone camera.

9. An article of manufacture comprising a storage medium containing instructions that when executed cause a system to:

analyze video streams from a plurality of video sources for feature points;

stitch the video streams together using the feature points to generate a unified stream, wherein when more than two video streams include a same feature point, discarding at least one of the more than two video streams having a lower weight than other video streams of the more than two video streams from the stitching;

process the video streams to make video qualities of the video streams more consistent with each other; and output the unified stream to a display.

10. The article of claim 9, wherein the instructions for processing the video streams to make the video qualities of the video streams more consistent with each other comprise instructions that when executed cause the system to at least one of:

scale the video streams to have a substantially similar scale;

adjust a color balance of the video streams to have a substantially similar color balance;

adjust a resolution of the video streams to have a substantially similar resolution;

adjust a contrast of the video streams to have a substantially similar contrast;

adjust a brightness of the video streams to have a substantially similar brightness; or crop a window size of the video streams to have a substantially similar window size.

11. The article of claim 9, wherein the instructions for stitching the processed video streams together using the feature points to generate a unified stream comprise instructions that when executed cause the system to:

identify a same feature point in two video streams;

align the two video streams on the same feature point; and join the two aligned video streams into a unified video stream.

12. The article of claim 11, further comprising instruction that when executed cause the system to display a video stream separately from the unified stream when the video stream has no features in common with the other video streams.

13. The article of claim 9, further comprising instruction that when executed cause the system to analyze the unified stream and plurality of video streams to generate a room model.

14. The article of claim 13, further comprising instruction that when executed cause the system to generate suggestions for camera placement location based on the room model.

15. An apparatus, comprising:

a logic device;

a video stitching module operative on the logic device to:

stitch a plurality of video streams together, received from a plurality of video sources in a room, using feature points in the video streams to generate a unified stream, wherein when more than two video streams include a same feature point, discarding at least one of the more than two video streams having a lower weight than other video streams of the more than two video streams from the stitching;

process the video streams to make the video qualities of the video streams more consistent with each other; and output the unified stream.

16. The apparatus of claim 15, further comprising a feature point identifier operative on the logic device to analyze the plurality of video streams to identify feature points in the video streams and provide the identified feature points to the video stitching module.

17. The apparatus of claim 15, the video stitching module further operative on the logic device to identify a same feature point in two video streams, align the two video streams on the same feature point, and join the two aligned video streams into a unified video stream.

18. The apparatus of claim 15, the video stitching module further operative on the logic device to:

scale the video streams to have a substantially similar scale;

adjust a color balance of the video streams to have a substantially similar color balance;

adjust a resolution of the video streams to have a substantially similar resolution;

adjust a contrast of the video streams to have a substantially similar contrast;

adjust a brightness of the video streams to have a substantially similar brightness; or crop a window size of the video streams to have a substantially similar window size.

19. The apparatus of claim 15, further comprising a room model builder operative on the logic device to use the unified stream and the plurality of video streams to generate a room model.

20. The apparatus of claim 15, wherein the video sources include at least one of: a fixed camera, a pan-tilt-zoom (PTZ) camera, a camcorder, a tabletop camera, a 360 degree camera, a webcam, a laptop computer built-in camera, and a cell phone camera.

* * * * *